United States Patent [19]

Oxley et al.

[11] Patent Number: 5,084,283
[45] Date of Patent: Jan. 28, 1992

[54] FOOD CASING FOR MAKING INDICIA BEARING FOOD PRODUCTS

[75] Inventors: Jeffery A. Oxley, Naperville; Myron D. Nicholson, Lemont, both of Ill.

[73] Assignee: Viskase Corporation, Chicago, Ill.

[21] Appl. No.: 191,100

[22] Filed: May 6, 1988

[51] Int. Cl.⁵ .............................................. A22C 17/10
[52] U.S. Cl. .................................... 426/87; 426/105; 426/135; 426/383
[58] Field of Search ............... 426/87, 135, 105, 383; 264/567, 566

[56] References Cited

U.S. PATENT DOCUMENTS

| | | | |
|---|---|---|---|
| D.214,255 | 6/1969 | Swartz et al. | |
| 683,765 | 10/1901 | Howard | 426/383 |
| 1,958,588 | 5/1934 | Oppenheimer | |
| 1,959,978 | 5/1934 | Freund | |
| 2,240,348 | 4/1941 | Payton | |
| 2,255,810 | 9/1941 | Replogle | |
| 2,275,347 | 3/1942 | Charch et al. | 264/218 |
| 2,301,564 | 11/1942 | Menges | 426/135 |
| 2,477,767 | 8/1949 | Remer | |
| 2,521,101 | 9/1950 | Thor et al. | |
| 2,860,052 | 11/1958 | Firth et al. | |
| 3,695,904 | 10/1972 | Coleman | 426/135 |
| 3,898,348 | 8/1975 | Chiu et al. | 426/105 |
| 4,038,438 | 7/1977 | Rahman et al. | 427/385.5 |
| 4,162,557 | 7/1979 | Rasmussen | 17/45 |
| 4,162,693 | 7/1979 | Beckman | |
| 4,292,711 | 10/1981 | Becker | 17/49 |
| 4,384,006 | 5/1983 | Wallick | |
| 4,466,157 | 8/1984 | Bos | |
| 4,781,931 | 11/1988 | Jon et al. | 426/135 |

FOREIGN PATENT DOCUMENTS

| | | |
|---|---|---|
| 713510 | 7/1965 | Canada. |
| 1158528 | 8/1959 | Fed. Rep. of Germany. |
| 3101424 | 9/1982 | Fed. Rep. of Germany. |
| 61-13790 | 4/1986 | Japan. |
| 62-33850 | 7/1987 | Japan. |
| 63-67473 | 12/1988 | Japan. |
| 595797 | 3/1945 | United Kingdom. |
| 2107361 | 4/1983 | United Kingdom. |
| 2142557 | 1/1985 | United Kingdom. |

OTHER PUBLICATIONS

Japanese advertisement for "American Grill containing photographs and translation".
Advertisement for Dubuque "Plumpers"—1 page.

*Primary Examiner*—Donald E. Czaja
*Assistant Examiner*—D. Workman
*Attorney, Agent, or Firm*—Roger Aceto

[57] ABSTRACT

A cellulosic casing for making skinless frankfurters has distinguishing indicia such as a pattern of grill marks on one surface of the casing. The indicia is formed by printing, for example with caramel, onto the casing surface. The caramel remains on the casing surface and is non-diffusible into the casing. During the stuffing and processing of a food product in the casing, the indicia bearing casing surface is in contact with the food product so the indicia releases and indelibly transfers to the contiguous surface of the food casing. The method of making the casing article, stuffing it and the resulting indicia bearing food product are also disclosed.

3 Claims, 3 Drawing Sheets

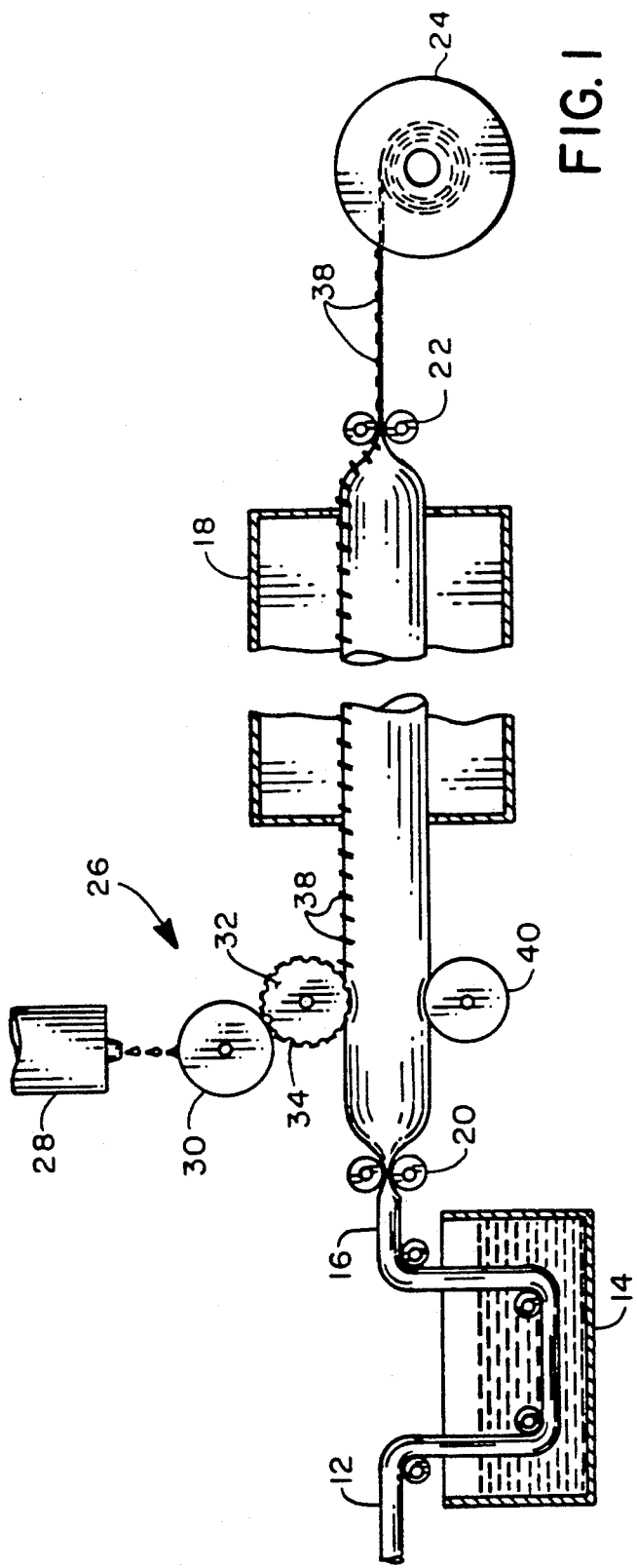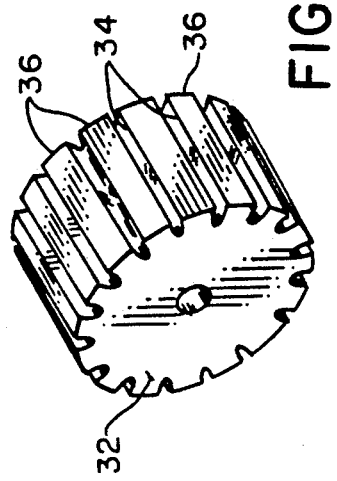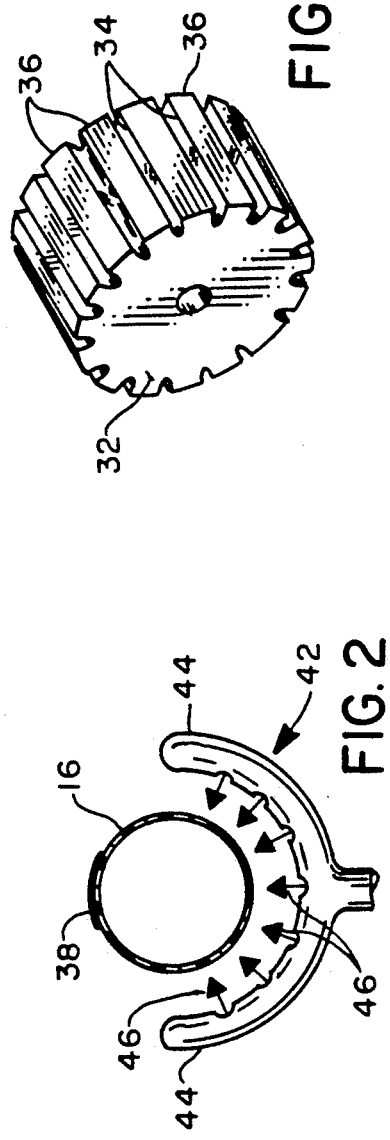

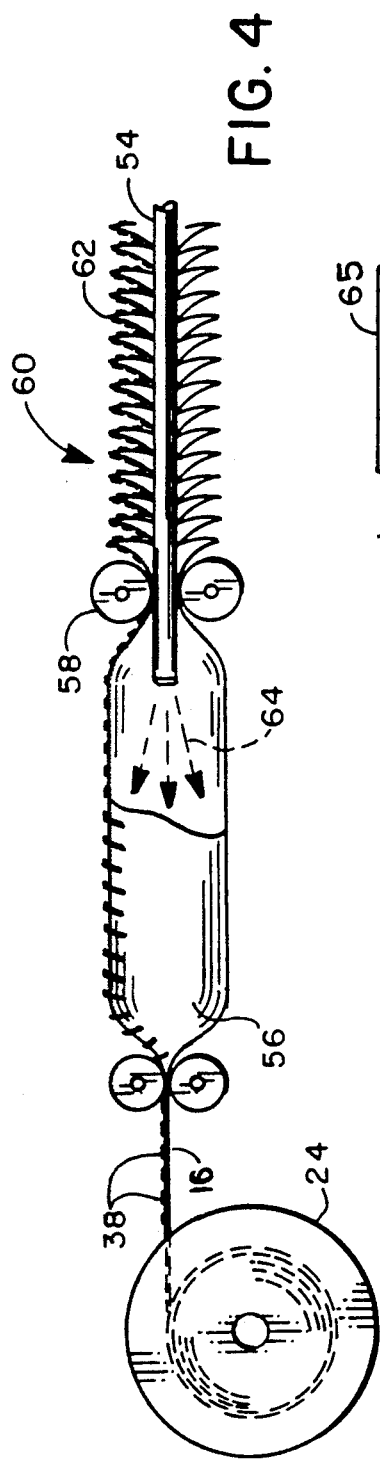
FIG. 4
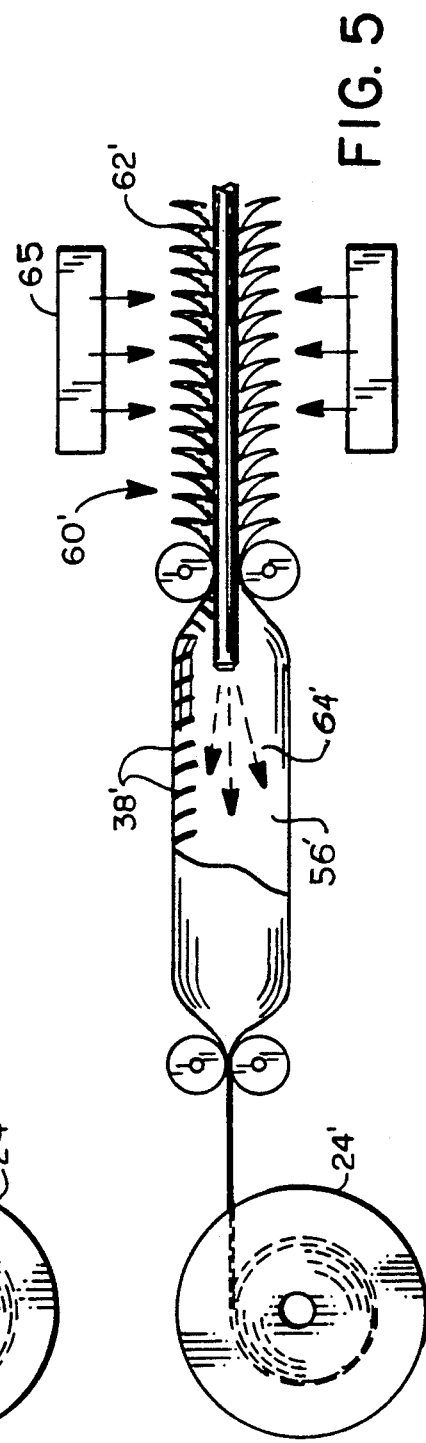
FIG. 5
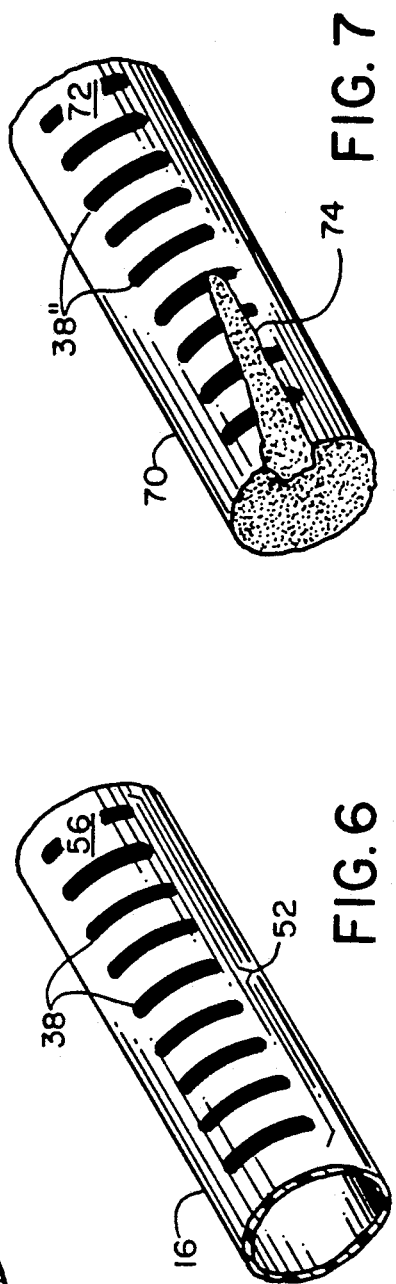
FIG. 7
FIG. 6

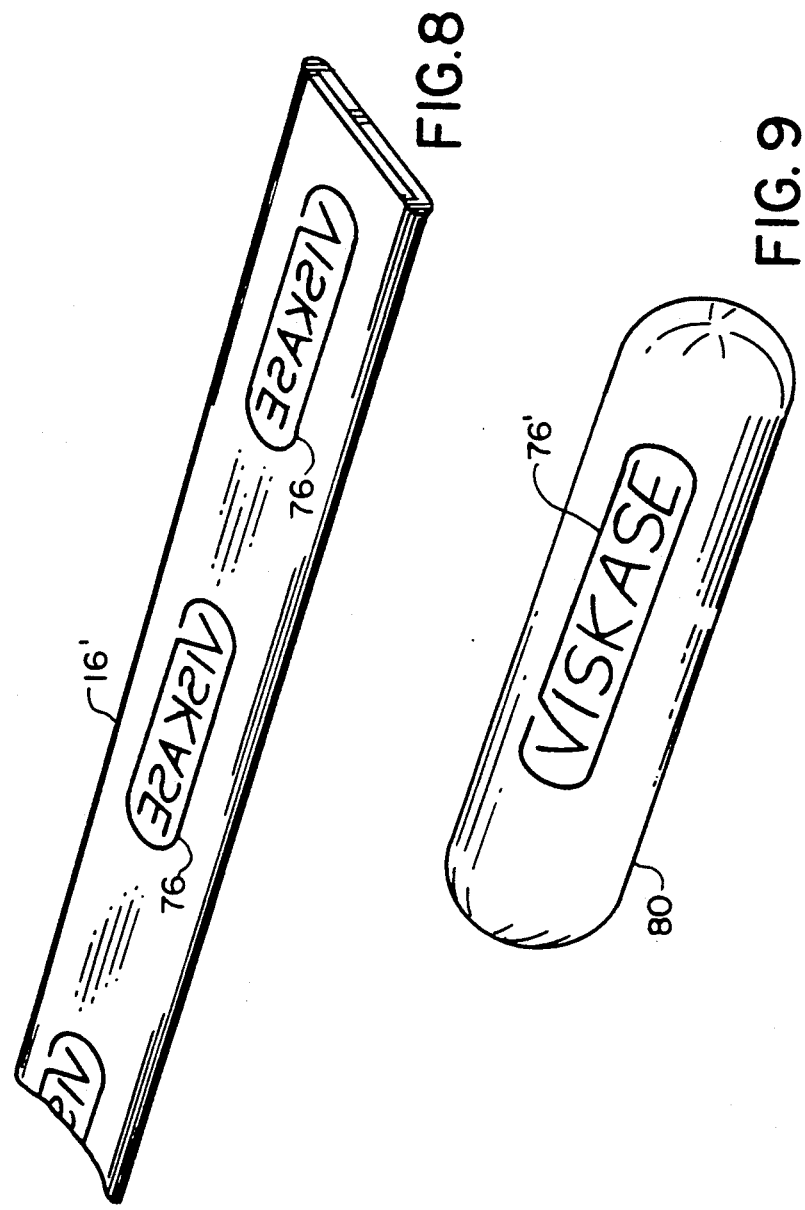

FOOD CASING FOR MAKING INDICIA BEARING FOOD PRODUCTS

TECHNICAL FIELD

The present invention relates generally to means for applying distinguishing marks or indicia to the surface of food products such as sausage and the like. More particularly, the present invention relates to a food casing for manufacturing a skinless sausage wherein the casing includes indicia formed of an edible material and wherein the indicia is transferable to the surface of the sausage stuffed into the casing.

BACKGROUND O THE INVENTION

It has been proposed to improve the eye appeal of certain food products such as processed meats by providing the food product with surface ornamentation such as a logo, design or other decorative pattern. For example, eye appeal of skinless sausages, such as frankfurters and the like, is improved by marking the surface to simulate the burn mark pattern caused by grilling the sausage. In one method, the application of the so-called "grill marks" is accomplished by passing the frankfurters over hot wires to brand them. However, this method has not been widely adopted by the meat packing industry.

Casings most commonly used for manufacturing encased food products such as processed meat articles comprise relatively long, thin-walled tubes of regenerated cellulose prepared by extruding and then coagulating a viscose solution. Cellulosic casings of regenerated cellulose are either reinforced with a fibrous web (hereinafter "fibrous casing") or unreinforced. Unreinforced casing generally is used in preparing smaller diameter products such as frankfurters and the like whereas fibrous casings are used in preparing larger diameter products such as bologna and hams.

For convenience in handling, the casings, which may be twenty to seventy meters or more in length, are shirred and compressed to produce what are commonly referred to in the art as "shirred casing sticks." These sticks, which measure about twenty to seventy centimeters in length, may contain upwards of 70 meters or more of casing. processes for manufacturing cellulosic casings and for subsequently shirring them to produce the shirred sticks are well known in the art and will only be described herein in sufficient detail to facilitate an understanding of the present invention.

Utilizing the casing to apply markings to the surface of a sausage has been attempted. For example, in U.S. Pat. No. 2,301,564 an aniline ink is printed on the outside of the casing. During sausage processing operations subsequent to stuffing the ink permeates and passes direct)y through the casing wall to the surface of the sausage meat. The '564 Pat. indicates that a clear outline of the markings are reproduced on the sausage surface. However, it is not believed that the clarity of the marking on the sausage surface will satisfy commercial requirements for sharpness and clarity. For example, tests conducted with conventional water soluble food dyes such as U.S. Government approved food, drug and cosmetic dye Red 40 (molecular weight about 400) were successful in that a pattern of grill marks printed on the outer surface of the casing passed through the casing wall and indelibly transferred to a frankfurter made by stuffing and processing a frankfurter emulsion within the casing. However, the diffusion of a-low molecular weight water soluble dye such as Red 40, through the casing wall disperses the dye. The result is that the pattern transferred onto the food product is not as sharp and distinct as the pattern initially printed on the outer surface of the casing. Also, the dye tends to diffuse into the body of the frankfurter which further decreases the sharpness and distinctiveness of the transferred pattern on the surface of the frankfurter. Certain other known coloring materials, such as liquid smoke and synthetic brown dyes, have the same difficulty.

Accordingly, an object of the present invention is to provide a food casing having indicia on one surface thereof which is substantially nondiffusible into the casing and which is indelibly transferable to a food product stuffed into the casing in contact with the surface.

Another object is to provide such a casing in which the indicia is composed of a material which remains on the casing surface to which it is applied and subsequently transfers from that surface directly onto the surface of a food product stuffed into the casing and in contact with the casing surface.

Still another object is to provide such a casing wherein the indicia forms a pattern of grill marks which are transferable to the food product.

A yet further object is to provide a method for making such a food casing.

A still further object is to provide a skinless food product having surface ornamentation derived from indicia located on a casing surface in contact with the food product, and to a method for making such a food product.

In the present invention, the casing used in the manufacture of the encased food product is provided with means for imparting a clear, sharp image of an ornamentation, logo or other desired indicia to the surface of the product processed within the casing.

In this respect, one surface of the cellulosic casing is provided with indicia in mirror image to the pattern desired on the surface of the food product. During stuffing, the casing surface carrying the indicia is brought into direct contact with the food product stuffed into the casing. The indicia material comprises an edible material which releases from the casing surface and transfers to the surface of the food product so that after stuffing and processing a mirror image of the pattern remains on the surface of the product when the casing is removed.

To be effective, the indicia on the casing surface should comprise a coloring material that provides a distinct, sharp pattern. Casing manufacturing and shirring operations performed after application of the indicia material to the casing should not smear or distort the indicia. Otherwise, the pattern, when transferred to the processed sausage, is blurred and/or distorted. The indicia material may be applied in-line during the production of the casing. If this is done, the indicia material must remain on the casing during subsequent handling of the casing including shirring of the casing to produce the shirred stick and the eventual despairing of the casing to stuff it. However, the indicia material should be releasable from the surface of the casing on stuffing and/or processing so the indicia can transfer to the surface of the food product in contact with the casing.

The indicia material should lie on the surface of the casing on which it was applied and should not diffuse or otherwise substantially penetrate into the casing wall.

This will insure that substantially all of the indicia material is available for release and transfer to the food product within the casing, thereby providing as distinct a pattern as possible. It further is necessary for the indicia material to remain on the surface of the food as the casing is removed to make a skinless food product.

Application of the indicia material to the casing can be accomplished by any suitable means such as by stenciling, spraying or printing. A printing operation is preferred and will be described further herein below. For purposes of printing, the indicia material must be transferable from the printing plate and onto the casing surface.

SUMMARY OF THE INVENTION

In one aspect, the present invention is characterized by a food casing for making indicia-bearing food products comprising a cellulosic casing having a surface adapted for direct contact with a food product stuffed and processed in the casing; and an indicia material disposed on said surface in a desired ordered pattern extending along said casing, said indicia material being edible and substantially nondiffusible from said surface and into said casing and also being releasable from said surface and indelibly transferable to the contiguous surface of the food product stuffed and processed in the casing.

In another aspect, the invention is characterized by a method of making an indicia transferring cellulosic food casing comprising applying to the external surface of said food casing an indicia in the form of a repeated ordered pattern composed of an edible coloring material which is substantially nondiffusible from said surface and into said casing and which is indelibly transferable from said surface to the contiguous surface of a food product stuffed and processed in said casing.

In yet another aspect, the invention is characterized by a skinless proteinaceous food product of the type which is processed as stuffed material within a casing, said food product having indicia arranged in an ordered pattern on the surface thereof wherein said indicia is substantially nondiffusible into the food product from the surface thereof and is composed of an edible coloring material which is substantially nondiffusible into a said casing and is transferred to said food product from a contacting surface of a said casing during processing of said stuffed material in a said casing.

In a further aspect, the invention is characterized by a method of making an indicia-bearing food product comprising:

a) providing a cellulosic casing having a food product contacting surface which carries indicia composed of an edible coloring material disposed on said surface in an ordered pattern, said coloring material being substantially nondiffusible from said surface into said casing;

b) stuffing a food product into said casing so that the outer surface of the food product is in direct contact with said casing food product contacting surface;

c) processing said food product within said casing to cook the product and indelibly transfer said indicia from said casing surface to the outer surface of the food product; and thereafter d) removing the casing to provide a skinless food product having a mirror image of the indicia indelibly associated with the outer surface of the skinless food product.

In the invention, the indicia to be transferred to the food product is applied to the casing surface (hereafter sometimes referred to as the "food contacting surface") which comes in direct contact with the food product processed within the casing. preferably the indicia is applied to the outside of a tubular casing. Thereafter the casing is turned inside out so the indicia is on an inside or food contacting surface. The indicia forms an ordered pattern which extends along the casing. To simulate grill marks, the pattern takes the form of parallel lines extending along the casing transverse to the longitudinal axis of the casing. However, the indicia could be in the form of any desired ornamentation or pattern such as a company name or logo and it could extend along one side or along diametrically opposite sides of the casing.

Water is a constituent of most stuffable food products. Also, many encased food products are processed or cooked With steam or in a high humidity environment such as a smoke house. Accordingly, it is believed that the transfer of the indicia material from the food contacting surface of the casing and onto the surface of the food product stuffed into the casing is facilitated if the indicia material is water dispersible and preferably if it is water soluble.

Indicia material of this type can be incorporated into either a water or solvent based system for purposes of applying it to the casing. In either case, a mirror image of a desired pattern composed of the indicia material is applied to the casing and dried. Thereafter, the moisture in the stuffable food product or in the high humidity processing environment will effect the release of indicia material from the food contacting surface of the casing so that the pattern can transfer directly onto the surface of the food product in contact with the casing and indicia material. Once the release and transfer is effected, the indicia material provides a substantially indelible mark on the surface of the food product which remains even after the casing is removed.

Indicia material suited for use in the present invention is not significantly diffusible into the casing wall so that substantially all the indicia material is available for transfer to the surface of the food product. Examples of nondiffusible coloring materials considered suitable include a natural or synthetic caramel, chocolate and chocolate extracts, a carotenoid such as paprika or saffron, carbon black and titanium dioxide. A caramel based coloring material is the preferred indicia material.

Caramel is a food approved coloring material and is water soluble. It was found that when the caramel is applied to the casing surface it remains substantially on the surface and does not migrate or diffuse to any significant extent into the casing wall. This is attributed to the molecular weight of the caramel which is composed of constituents having molecular weights from below 2.000 to over 10,000. Accordingly, a large portion, if not-all of the caramel which is applied to the surface of the casing is transferable to the food product. Either a natural or a synthetic caramel or other high molecular weight water soluble coloring may be used provided it is edible.

Paprika, chocolate and chocolate extracts, titanium dioxide and carbon black are examples of nondiffusible coloring materials which have molecular weights lower than caramel but nevertheless are considered suitable for use. These materials are generally not water soluble and for this reason they would not readily diffuse through the casing wall. However, they are water dispersible and would be transferable from the casing to the encased food product.

Application of the indicia material is most easily accomplished by passing the casing through an applicator which prints or otherwise applies a mirror image of the desired pattern onto the outer surface of the casing. Since little, if any, of the indicia material diffuses into the casing, the casing must be inverted for stuffing so that the outside surface of the casing having the mirror image printed pattern becomes the casing inside surface in direct contact with the food product (i.e., the "food contacting surface"). Inverting the casing can be accomplished prior to stuffing or during stuffing. U.S. Pat. No. 4.162,557 discloses a method for inverting casing prior to stuffing whereas U.S. Pat. No. 4,162,693 discloses a method for inverting casing during stuffing. Both of these patents are incorporated herein by reference.

Application of the indicia material onto the exterior surface of the casing can be accomplished "off-line" after the casing manufacturing process is complete or "in-line" as part of the casing manufacturing process.

Briefly, a regenerated cellulose casing is made by extruding a viscose solution through an annular die into an acid regenerating bath. This coagulates the viscose to form what is commonly referred to as a "gel tube". The moisture content of this gel tube is over 200% based on the weight of the cellulose. In a conventional process, the gel tube is inflated and is passed through a dryer to set the cellulose. The dried casing then is passed in-line through a moisture equalizing chamber where its moisture content is adjusted to facilitate subsequent handling and processing. The in-line dryer and moisture equalizing chamber are hereafter collectively referred to as the "dryer". On exit from the dryer the casing has a moisture content of about 13% to 18% based on the dry weight of cellulose in the casing and is wound flat not reels.

To practice the present invention, an in-line application of the indicia material can be accomplished at the entrance to the dryer so that the desired pattern is applied to the exterior of the inflated gel tube. Preferably, the application is by a printing means in the form of one or more rolls which are driven by contact with the casing passing into the dryer.

The drying temperature and retention time of the casing in the dryer should be selected to permit the indicia material to dry sufficiently so it does not block, stick or transfer to the opposing layer of casing as the casing is reeled on leaving the dryer. It has been discovered that when caramel-based water soluble indicia material is used, a temperature and retention time sufficient to lower the moisture of the casing to a maximum of 14% based on the weight of dry cellulose is sufficient to eliminate such blocking, sticking or transfer.

If the casing within the dryer rubs against guides or the like in the dryer before the indicia material is sufficiently dry, the printed patterns may smear along the casing. Accordingly, passage of the printed inflated casing through the dryer should be arranged to prevent, as much as possible, a rubbing contact with the walls of the dryer or with guides within the dryer. This can be accomplished by supporting the casing within the dryer on air bearings to avoid as much physical contact as possible with the casing.

The casing can be shirred in a conventional manner with the indicia material on the exterior surface of the casing. If this is done, the casing is inverted during stuffing to place the the indicia material on the inside of the casing and in intimate contact with the food products stuffed into the casing.

As an alternative, the casing with the indicia material on its exterior surface can be inverted and then shirred. This places the indicia material on an inside surface of the casing so there is no need to invert the casing during stuffing It is conventional during the course of shirring a cellulosic casing to spray the interior surface of the casing with an aqueous solution. For example, U.S. Pat. No. 3 981,046 describes a conventional humidification technique in which an aqueous solution is applied as an internal spray to humidify the casing to raise the moisture content of the casing to a level better suited for shirring and subsequent stuffing. In the event the casing is shirred with the indicia material on the outer surface of the casing, this conventional humidification technique can be used. However, if the casing is inverted prior to shirring, this conventional humidification technique should be altered as discussed below so as to prevent the aqueous solution from degrading a water soluble indicia material.

DRAWINGS

FIG. 1 is a schematic representation of part of a cellulosic manufacturing system suitable for making the casing of the present invention;

FIG. 2 is a view on an enlarged scale showing an end view of a component preferably used in the manufacturing system;

FIG. 3 is a perspective view showing an applicator suitable for applying the indicia material to the casing according to the FIG. 1 system;

FIGS. 4 and 5 are schematic representations of alternate systems for shirring the indicia-containing casing of the present invention;

FIG. 6 is a perspective view showing a section of one casing embodiment of the present invention wherein the indicia applied to the outside surface of the casing simulates grill marks;

FIG. 7 is a perspective view showing a portion of a skinless food product having surface ornamentation in the form of simulated grill marks as made using the casing of FIG. 6;

FIG. 8 is a view showing a flattened casing having indicia applied thereto representing a corporate logo; an FIG. 9 is a view showing a skinless frankfurter made using the FIG. 8 casing.

DETAILED DESCRIPTION OF THE INVENTION

Referring to the drawings, FIG. 1 illustrates a portion of a process for manufacturing the indicia containing cellulosic casing of the present invention. In this process, a viscose tube 12 is extruded and passed through one or more solution tanks 14 to coagulate and treat the viscose, thereby forming a cellulosic casing 16. At this stage the casing is in a gel state and has a moisture content of over 200% based on the dry weight of the cellulose in the casing. The casing then passes longitudinally through a dryer 18. Nip rolls 20,22 at the dryer inlet and outlet maintain the casing in an inflated condition to prevent diametrical shrinkage and to facilitate drying. On leaving the dryer the casing is wound flat onto a reel 24.

According to one embodiment of the present invention, an applicator means generally indicated at 26, is arranged at the dryer inlet. This applicator 26 is arranged to apply a transferable indicia material in mirror image to a desired pattern to the exterior surface of the gel state casing. As further discussed herein, a preferred indicia material is a dispersion or an aqueous solution of a caramel based coloring. Accordingly, for purposes of illustration, the indicia material is sometimes referred to hereafter as being caramel or caramel based.

As shown in FIG. 1, applicator 26 includes a reservoir 28, an absorbent foam roller 30 and a printing wheel 32. The reservoir 28 contains a supply of the indicia material which is delivered to foam roller 30. Foam roller 30 is in direct contact with printing wheel 32 so that the indicia material on roller 30 is transferred to the printing wheel. The printing wheel 32 has a printing surface 34 engraved with the mirror image of the pattern desired on the food product. In the embodiment as shown, the desired pattern is intended to simulate grill marks to enhance the eye appeal of a skinless frankfurter or the like. For this purpose, the printing wheel surface 34 has a plurality of raised cogs or teeth 36 (FIG. 3) for applying an ordered pattern of equally spaced simulated grill marks 38 directly to the exterior surface of the casing in the gel state. Diametrically opposite the printing wheel 32 is an opposing support wheel 40. It should be appreciated that this opposing support wheel 40 also can be a printing wheel.

To function properly, printing wheel 32 must receive and retain a supply of the indicia material from the foam roll 30 and in turn transfer it onto the cellulosic casing outer surface. When applying an aqueous solution of a caramel-based coloring to the casing as the indicia, a suitable printing wheel is a roller made of compressed Nylon fibers.

Smearing of the pattern on application to the exterior surface of the gel state casing is avoided by matching the peripheral speed of the printing wheel 32 to the linear speed of the casing 16. This can be accomplished by using the casing to drive the printing wheel through friction, or by driving the printing wheel with other means (not shown) to provide the proper matching of speeds.

The indicia material is readily applied to the high moisture casing 16 entering the dryer 18. The dryer temperature and retention time should be sufficient to lower the casing moisture content to a level where the indicia material is sufficiently dry to prevent sticking or offsetting onto an opposing layer of the casing in reel 24. When caramel is used, the moisture content of the casing leaving the dryer should be not more than about 14% based on the weight of dry cellulose. At casing moisture above about 14%, the caramel still has sufficient tack to block, stick or offset onto an opposing layer of the casing as the casing is wound onto reel 24. Drying of the indicia material can be accelerated by suspending it in a solvent solution rather than in an aqueous solution.

Within dryer 18, it is conventional to provide guides (not shown) at spaced intervals to support and guide the relatively long spans of casing passing through the dryer. It was found that guides which support the casing by direct contact caused smearing of the just-applied indicia material. One method to prevent this smearing is to maintain an orientation of the casing in the dryer which positions the indicia-marked portion of the casing outer surface away from contact with the guides. A preferredd solution is to provide guides in the form of air bearings which avoid physical contact with the casing.

One form of such an air bearing guide for use in the dryer is a substantially y-shaped guide generally indicated at 42 in FIG. 2. The arms 44 of the y-shaped guide contain a plurality of air passages (not shown) which direct streams of air 46 against the casing 16 to support the casing and prevent direct physical contact between the casing and guide. The air flow required to support the casing varies depending upon the casing size and the distance between guides. Determination of the proper air flow is well within the skill of the art.

FIG. 6 illustrates one casing embodiment of the present invention wherein the indicia 52 is formed of a caramel-based coloring. As shown, the indicia 52 is in the form of a repeated ordered pattern applied to and extending along the casing exterior surface 56. The repeat and order derives from applying the caramel coloring onto casing exterior surface 56 as the casing 16 moves at a relatively constant speed across a printing wheel 32 rotating at the same speed (FIG. 1). The particular pattern illustrated in FIG. 6 is composed of a plurality of short parallel line segments 38 disposed transverse the longitudinal axis 15 of the casing to simulate grill marks.

The grill marks 38 are disposed on a surface of the casing adapted to come into direct contact with the food product stuffed into the casing. Since the indicia 52 is disposed on an exterior surface 56 of the casing and is substantially nondiffusible into and through the casing wall, the casing must be inverted either before or during stuffing to locate the pattern 52 on the inside of the casing.

FIGS. 4 and 5 illustrate alternative methods for shirring the indicia-containing casing 16 illustrated in FIG. 6. In FIG. 4, reel 24 from FIG. 1 contains casing 16 having indicia composed of pattern of grill marks 38 on its outer surface 56. Casing from this reel is unreeled and fed directly to a conventional shirring machine generally indicated at 60. Shirring proceeds in a conventional manner in that the casing 16 is inflated and fed onto a mandrel 54. The casing passes along the mandrel and through a conventional shirring head 58 which gathers the casing into pleats and forms a shirred stick indicated at 62. The shirring mandrel 54 is hollow so that an aqueous shirring solution can be delivered as a spray 64 to the interior of the casing. As mentioned hereinabove, a conventional shirring solution includes a water phase. This is applied in an amount sufficient to dehumidify the casing in order to raise the moisture content from about the 14% level of the reeled casing to a level suitable for shirring and stuffing. In the shirring method as shown in FIG. 4 the total moisture added by the shirring solution would be about 12% to 14% in order to raise the casing moisture content from about the 14% level of the reeled casing to about 26% to 28%.

The shirred stick 62 formed in this fashion contains casing having the indicia e.g., pattern of grill marks 38, on an outside surface. Accordingly, this stick would be inverted during stuffing so as to locate the pattern of grill marks 38 on the inner surface (i.e., the food contacting surface) of the casing. Inversion during stuffing is accomplished by turning and passing the casing through the bore of the stick as generally shown, for example, in U.S. Pat. Nos. 4,292,711 and 4,162,693.

In FIG. 5, the casing from reel 24 (FIG. 1) is first unreeled and broken down into shorter lengths. These shorter lengths are then inverted and rewound onto a new reel 24' as generally shown in U.S. Pat. No. 4,162,557. This locates the indicia composed of, the pattern of grill marks 38' on an inside surface 56' of the casing. The casing is then unreeled from reel 24' and fed directly to a conventional shirring machine 60'. As an alternative, the '557 Pat. says the inverted casing can be fed directly to a shirring machine.

If the indicia comprising the pattern of grill marks 38' is formed of a water soluble material such as a caramel coloring, it has been discovered that the internal spraying of an aqueous shirring solution for rehumidifying the casing should be modified from conventional practice. In particular, the water content of spray 64' is reduced so as not to wash off the indicia material or otherwise destroy the integrity of the pattern. This may be accomplished by adding about 3% to 4% moisture in the internal spray of shirring solution to raise the moisture content of the casing from about the 14% of the reeled casing to about 17% to 18%. This provides the casing with sufficient moisture for shirring. After shirring, an additional 6% to 8% moisture can be externally added by a water applicator 64 which sprays moisture onto the outside surface of the stick 62' immediately after shirring. This amount of external spray is sufficient to raise the moisture level of the casing to about the 26% to 28% preferred for stuffing.

Since the indicia composed of the pattern of grill marks 38' is on an inside surface of the inverted casing, the stick produced by shirring the inverted casing can be stuffed in a conventional fashion and is not inverted during stuffing.

The method of applying indicia in-line with the casing manufacturing process as disclosed in FIG. 1 is suited for relatively simple indicia patterns such as the grill mark pattern illustrated. However, a slightly different application method is preferred for applying a corporate logo or other indicia involving a design more intricate than the straight lines required to simulate grill marks.

Preferably, application of a more intricate design to the casing is made in an off-line operation so the indicia can be applied while the casing is in a flattened condition. Application to flattened casing will improve the likelihood that a clear sharp image of the more intricate design is applied to the casing.

To apply the indicia material off-line, the high moisture gel casing is dried to about 13% to 18% moisture, flattened and then is wound onto a reel. The reel is then transported to an indicia applying operation where the casing is unwound. As the casing is unwound from the reel, the indicia is applied to the flattened casing. If desired, a conventional peeling said such as carboxymethyl cellulose (CMC) can be applied to the exterior surface of the gel state casing entering the dryer. Thereafter, the indicia material is applied directly onto the CMC coated surface.

FIG. 8 shows a section of flattened casing 16' wherein the indicia 76 applied to the outer surface of the casing is a mirror image of a corporate logo. The logo extends along the casing in a repeated ordered pattern as the result of applying the indicia material to the casing in a continuous operation as the casing unwinds from its reel. After the indicia material is applied, the casing goes through a second drying operation to dry the indicia material, and then is rewound. The additional drying step lowers the casing moisture content to well below 14%. At this low moisture level the casing is too brittle for shirring so it should be rehumidified to about the 14% level prior to commencing the shirring operation.

To demonstrate the invention, an in-line application of grill marks to a frankfurter size cellulose casing was accomplished using the system shown in FIG. 1. In this respect, a printing wheel made of compressed Nylon fibers applied a caramel coloring material in a grill mark pattern to the high moisture gel casing entering the dryer. The caramel used was a double strength acid proof caramel color having a solid content of about 51% which is sold by Sethness products Company as No. DS 400. This caramel color comprises constituents of various molecular weights. In particular, 27 wt. % of the caramel constituents have molecular weights above 10.000; 14 wt.% are in the 2,000–10,000 range; and 59 wt.% are below 2,000. The casing was dried to a moisture content of about 14% based on the weight of dry cellulose and reeled on exit from the dryer. The casing then was shirred with the grill mark pattern on the outside surface as shown in FIG. 4 while applying an internal shirring solution to raise the casing moisture level to about 26% to 28%.

During the shirring of cellulosic casing for frankfurters, it is conventional to twist the shirred stick to improve the straightness of the stick. U.S. Pat. No. 3,398,069 and No. 4,649,961 disclose methods for radially displacing the pleats of shirred casing one from another joy imparting a twist to the stick during shirring. While a method and stick as disclosed in U.S. Pat. No. 4,649,961 is preferred, for purposes of this test the casing was shirred without twisting and instead the shirred sticks were supported on dowels to preserve straightness.

The shirred casing then was stuffed with a commercially available frankfurter meat emulsion using a commercial frankfurter stuffing machine known in the art as a Townsend FRANK A MATIC or "FAM" machine. During stuffing the casing is deshirred and inverted through the pore of the stick so the casing turns inside out. This locates the grill marks on the inside surface of the casing.

Conventional operation of the FAM requires that the shirred casing spin about the stuffing horn (see U.S. Pat. No. 3,115,668). Consequently, the inverted deshirred casing as it turns into the bore of the shirred stick and passes along the stuffing horn, may twist and seize onto the horn causing the casing to break. To reduce the likelihood of the casing seizing onto the horn and to facilitate the inversion during stuffing, the FAM stuffing horn was coated with a low friction material i.e., Teflon. Also, the shirred casing stick was maintained centered about the stuffing horn during stuffing to insure an annular clearance space between the horn outside diameter and the stick inside diameter for the passage of the casing being desired through the stick bore. Maintaining the centering of the shirred stick is accomplished by modifying the follower of the FAM so it fits over and supports the end of the stick.

It is possible to still further reduce the likelihood of the inverted casing seizing on the stuffing horn by using a stick as disclosed in U.S. Pat. No. 4.649,961. In this respect, the FA generally spins the shirred casing about the stuffing horn in a clockwise direction during spinning (looking in a direction into the stuffing horn). A stick as disclosed in U.S. Pat. No. 4,649,961 which has its pleat twist oriented in a direction opposite to the FAM spinning direction will counter and offset the tendency of the spinning inverted casing to twist and seize into the horn.

After stuffing, the stuffed casing was processed at about 20% relative humidity to cook the emulsion and the casing was removed to produce skinless frankfurters bearing the desired grill mark indicia. It was found that substantially all the caramel coloring material transferred from the casing to the surface of the frankfurter so that only a slight stain of caramel residue remained on the casing. Moreover, the grill marks on the skinless frankfurters were found to be indelible in that they could not be removed by manual rubbing and remained intact even after a further cooking of the skinless frankfurter in boiling water. Thus, even after boiling, the skinless frankfurters have the eye appeal of grilled frankfurters.

As a further demonstration, casing from reel 24 was inverted and then shirred according to the arrangement illustrated in FIG. 5. The internally sprayed shirring solution, including carboxymethyl cellulose (CMC) as a peeling said, was applied at a rate calculated to raise the moisture content of the casing about 4% (i.e , to about 18% based on the weight of dry cellulose) and to apply CMC to the interior of the casing at the rate of about 3.2 mg/100 in . After shirring, an additional 8% moisture was added to the external surface of the casing. The shirred casing was stuffed with a frankfurter emulsion using the FAM machine in a conventional manner, after which the stuffed casing was processed to coax the emulsion, and the casing was removed to produce skinless frankfurters. It was found that while the grill marks did transfer to the frankfurter, the marks were not as clearly defined as in the previous tests. It is speculated this is due in part to the application of the aqueous shirring solution directly onto the casing surface containing the water soluble grill marks. However, the transferred grill marks are indelible in that they cannot be rubbed off and survive boiling of the frankfurter.

Another caramel found suitable for use is Sethness products Company No. 858. This is similar to DS 400 except it is sold in powdered form and can be used in a 50 wt.% aqueous solution (i.e., 50% by weight caramel powder and 50% by weight water).

It has been found that a shirred ready-to-stuff casing having the caramel coloring indicia material preferably should one stuffed within a week of shirring. If stored for longer periods in a ready-to-stuff condition, the caramel coloring material is solubilized by the moisture in the casing and starts to bleed along the casing surface and offset of an adjacent pleat. The result on stuffing is a blurred, distorted and less defined image appearing on the skinless food product.

The storage period can be increased by lowering the moisture content of the casing although stuffing at less than optimum moisture levels risks an increase in the breakage rate of the casing. It also has been found that the storage period can be increased by mixing the caramel coloring with additives to render the caramel less soluble. For example, mixing the caramel with Kymene has been found to allow storage of a ready-to-stuff casing for two weeks and more without encountering the aforesaid bleeding and offsetting of the caramel coloring material. Kymene is a cationic resin sold by Hercules Chemical Company. A suitable mixture for rendering the caramel coloring less soluble comprises 35 wt.% water, 35 wt.% No. 858 caramel powder and 30 wt.% Kymene.

Another type of casing customarily used in food processing comprises shortcut lengths of fibrous casing ranging up to six feet in length. These casings are sold in a relatively dry state and are soaked in water just prior to stuffing to provide the required moisture content. Accordingly, the aforesaid storage period limitations would not exist if the caramel coloring is applied to this type of casing. However, provision must be made to prevent the indicia material, such as caramel, from being washed off the casing during soaking.

FIG. 7 illustrates a skinless frankfurter 70 made in the FIG. 6 casing. The frankfurter has a pattern on its outer surface derived from indicia material applied to the casing in which the frankfurter was made. In the embodiment shown, the pattern simulates grill marks 38" in mirror image to the pattrn 52 on the casing (FIG. 6). It should be noted that the grill marks are composed of the caramel coloring material indelibly transferred to the frankfurter surface. As shown in FIG. 7, the grill marks 38" are restricted substantially to the frankfurter surface 72 and the coloring material does not to any significant extent diffuse into the body 74 of the frankfurter beneath the surface.

FIG. 9 illustrates a skinless frankfurter 80 made using the casing embodiment of FIG. 8. Here the frankfurter carries a more intricate indicia comprising a corporate logo 76' which is in mirror image to the logo 76 on the casing 16'.

While the invention has been described with respect to the production of skinless frankfurters in shirred cellulosic casing, it should be appreciated that the present invention also can be applied to the processing or any encased proteinaceous food product. For example, the invention can be used to provide- other food articles which are processed in cellulosic food casings or wraps with a desired surface ornamentation. particular examples in addition to skinless frankfurters, include, but are not limited to, cheese, bologna, chopped and formed hams, process hams and poultry products.

In the foregoing examples, a dark higher molecular weight caramel was used to simulate the dark brown color of grill marks A lower molecular weight caramel would be used to provide a lighter brown color for the indicia. Other suitable coloring materials can be selected to provide colors for other types of indicia such as corporate logos or designs.

It is not essential that the food product be processed, and the casing recovered, prior to the food product reaching the consumer at the retail level. For example, the encased food product can be sold at the retail level wherein the consumer cooks the food product and removes the casing.

Thus, it should be appreciated that the present invention accomplishes its intended objects in providing a casing for making a indicia-bearing skinless food product wherein the casing includes the indicia which is indelibly transferable to the food product processed within the casing.

We claim:

1. A food casing for making indicia-bearing food products comprising a length of tubular cellulosic casing having a first cellulosic surface adapted for direct contact with a said food product stuffed and processed in said casing, and a second, non-food contacting surface opposite said first surface; indicia material disposed only on said first cellulosic surface in an ordered pattern extending along said casing in mirror image to the pattern desired on a said food product, said indicia material being edible and substantially nondiffusible from said first cellulosic surface and into said casing such that said second non-food-contacting surface remains free of said indicia material; said indicia material comprising a mixture of caramel and an additive to decrease the water solubility of the caramel; and said indicia material being releasable from said fist cellulosic surface and indelibly transferable to the contiguous surface o the said food product stuffed and processed in said length of cellulosic casing.

2. A food casing as in claim 1 wherein said additive is a cationic resin.

3. A food casing as in claim 1 wherein said indicia material comprises 35 wt% caramel powder, 35 wt% water and 30 wt% of a cationic resin to decrease the solubility of said caramel.

* * * * *

UNITED STATES PATENT AND TRADEMARK OFFICE
CERTIFICATE OF CORRECTION

PATENT NO. : 5,084,283

DATED : January 28, 1992

INVENTOR(S) : Jeffery A. Oxley et al

It is certified that error appears in the above-identified patent and that said Letters Patent is hereby corrected as shown below:

Column 1, line 15, delete "O" and insert —OF—.

Column 1, line 55, delete "direct)y" and insert —directly—.

Column 2, line 14, delete "indelibly" and insert —indelibly—.

Column 2, line 61, delete "despairing" and insert —deshirring—.

Column 5, line 37, delete "not" and insert —onto—.

Column 6, line 46, delete "an" and insert —and—.

Column 9, line 20, delete "64" and insert —65—.

Column 9, line 50, delete "said" and insert —aid—.

Column 10, line 27, delete "joy" and insert —by—.

Column 10, line 54, delete "desired" and insert —deshirred—.

Column 10, line 61, delete "FA" and insert —FAM—.

Column 11, line 19, delete "said" and insert —aid—.

Column 11, line 23, delete "mg/100 in" and insert mg/100 in$^2$—.

Column 11, line 27, delete "coax" and insert —cook—.

Column 11, line 44, delete "one" and insert —be—.

Column 12, line 31, delete "provide-other" and insert —provide other—.

Column 12, line 45, delete "recovered" and insert —removed—.

Column 13, line 5, delete "surface o the" and insert —surface of a—.

UNITED STATES PATENT AND TRADEMARK OFFICE
CERTIFICATE OF CORRECTION

PATENT NO. : 5,084,283
DATED : January 28, 1992
INVENTOR(S) : Jeffery A. Oxley, et al.

It is certified that error appears in the above-indentified patent and that said Letters Patent is hereby corrected as shown below:

Column 13, line 4, "fist" should read --First--.

Signed and Sealed this

Twenty-fourth Day of January, 1995

Attest:

BRUCE LEHMAN

Attesting Officer

Commissioner of Patents and Trademarks